United States Patent
Erhard et al.

(10) Patent No.: US 8,376,025 B2
(45) Date of Patent: Feb. 19, 2013

(54) CASTING MACHINE SYSTEM AND PROCESS FOR PRODUCING HYBRID METAL/PLASTIC ARTICLES

(75) Inventors: Norbert Erhard, Lorch (DE); Helmar Dannenmann, Schorndorf (DE); Juergen Kurz, Pluederhausen (DE); Knut Morgenstern, Chemnitz (DE); Wolgang Nendel, Oederan (DE); Tino Zucker, Mildenau (DE); Bernd Zimmer, Falkenstein/Vogtl (DE); Martin Kausch, Burghardtsdorf (DE)

(73) Assignee: Oskar Frech GmbH + Co. KG, Schorndorf-Weiler (DE)

( * ) Notice: Subject to any disclaimer, the term of this patent is extended or adjusted under 35 U.S.C. 154(b) by 0 days.

(21) Appl. No.: 12/809,300

(22) PCT Filed: Dec. 19, 2008

(86) PCT No.: PCT/EP2008/010955
§ 371 (c)(1),
(2), (4) Date: Sep. 24, 2010

(87) PCT Pub. No.: WO2009/083196
PCT Pub. Date: Jul. 9, 2009

(65) Prior Publication Data
US 2011/0000634 A1 Jan. 6, 2011

(30) Foreign Application Priority Data
Dec. 21, 2007 (DE) .......................... 10 2007 062 829

(51) Int. Cl.
*B22D 19/00* (2006.01)
*B29C 45/14* (2006.01)
(52) U.S. Cl. ........ 164/103; 164/113; 164/312; 425/112; 425/126.1; 264/259
(58) Field of Classification Search .................. 164/113, 164/119, 306, 312; 425/112, 126
See application file for complete search history.

(56) References Cited

U.S. PATENT DOCUMENTS

| 2,337,550 | A | | 12/1943 | Crosby |
| 4,744,742 | A | * | 5/1988 | Aoki .......................... 425/126.1 |
| 2004/0035548 | A1 | | 2/2004 | Koide et al. |
| 2006/0231231 | A1 | | 10/2006 | McCullough |

FOREIGN PATENT DOCUMENTS

| DE | 103 25 530 A1 | 12/2004 |
| EP | 1 718 451 | 11/2006 |
| GB | 2 432 549 A | 5/2007 |
| JP | 7-108559 A | 4/1995 |
| JP | 2000-280277 A | 10/2000 |
| JP | 2006-246783 A | 9/2006 |
| WO | WO 2005/053930 A1 | 6/2005 |

OTHER PUBLICATIONS

PCT/IB/338, PCT/IB/373, and PCT/ISA/237 (Eight (8) pages).
Wenzel M, "Durch Roboter Verkettet. Oelinked by Robots", Carl Hanser Verlag, Muenchen, DE, vol. 85, No. 9, Sep. 1, 1995, pp. 1353-1354, XP000522525 ISSN: 0023-5563.
International Search Report dated May 7, 2009 with English translation (six (6) pages).

* cited by examiner

*Primary Examiner* — Kuang Lin
(74) *Attorney, Agent, or Firm* — Crowell & Moring LLP

(57) ABSTRACT

A casting machine system includes a first casting machine and a separate second casting machine, wherein the first casting machine is a metal-casting machine and the second casting machine is a plastic-casting machine, or the first casting machine is a plastic-casting machine and the second casting machine is a metal-casting machine. An associated process produces hybrid metal/plastic articles. The casting machine includes a transfer device for transferring a precursor product, produced by a first casting process in the first casting machine, to the second casting machine, in which a hybrid metal/plastic component is formed from the precursor product by a second casting process, and a temperature-regulating device for regulating the temperature of the precursor product in a controllable manner after its removal from the first casting machine, and before starting the second casting process.

14 Claims, 4 Drawing Sheets

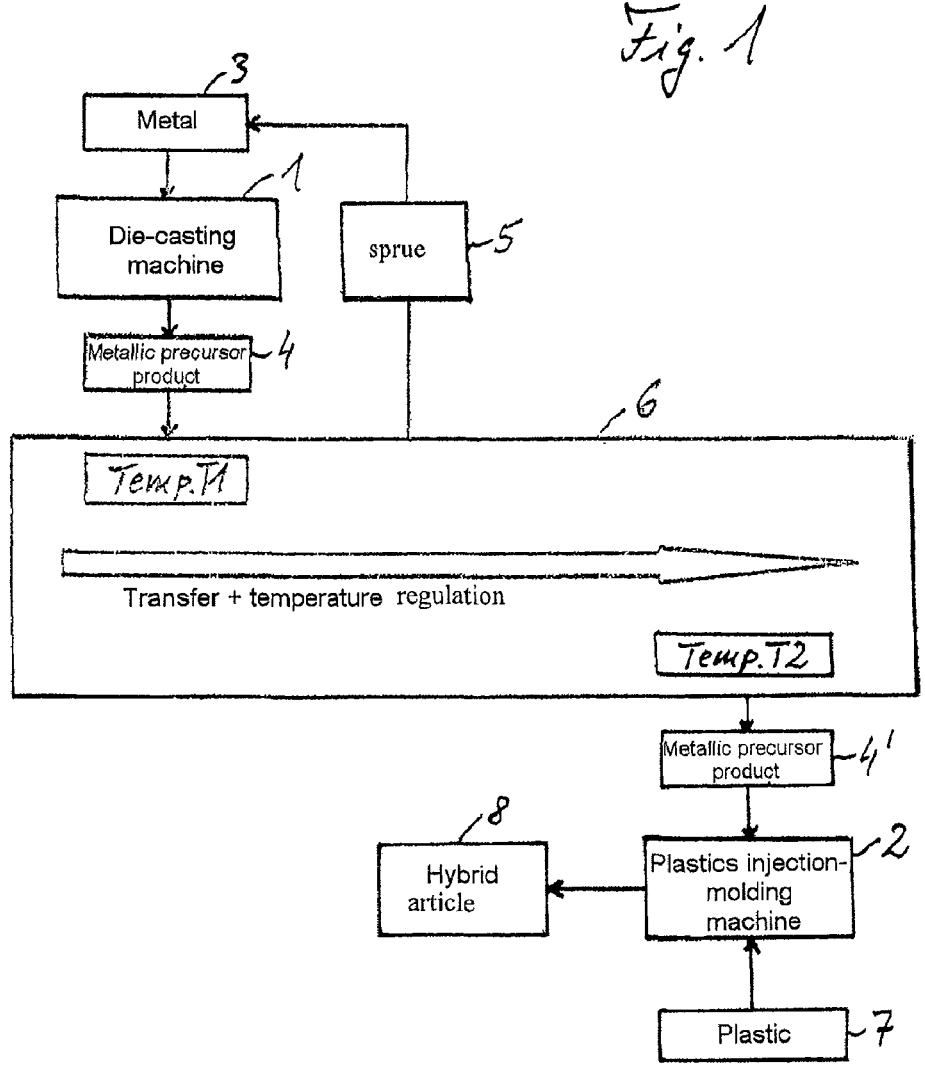

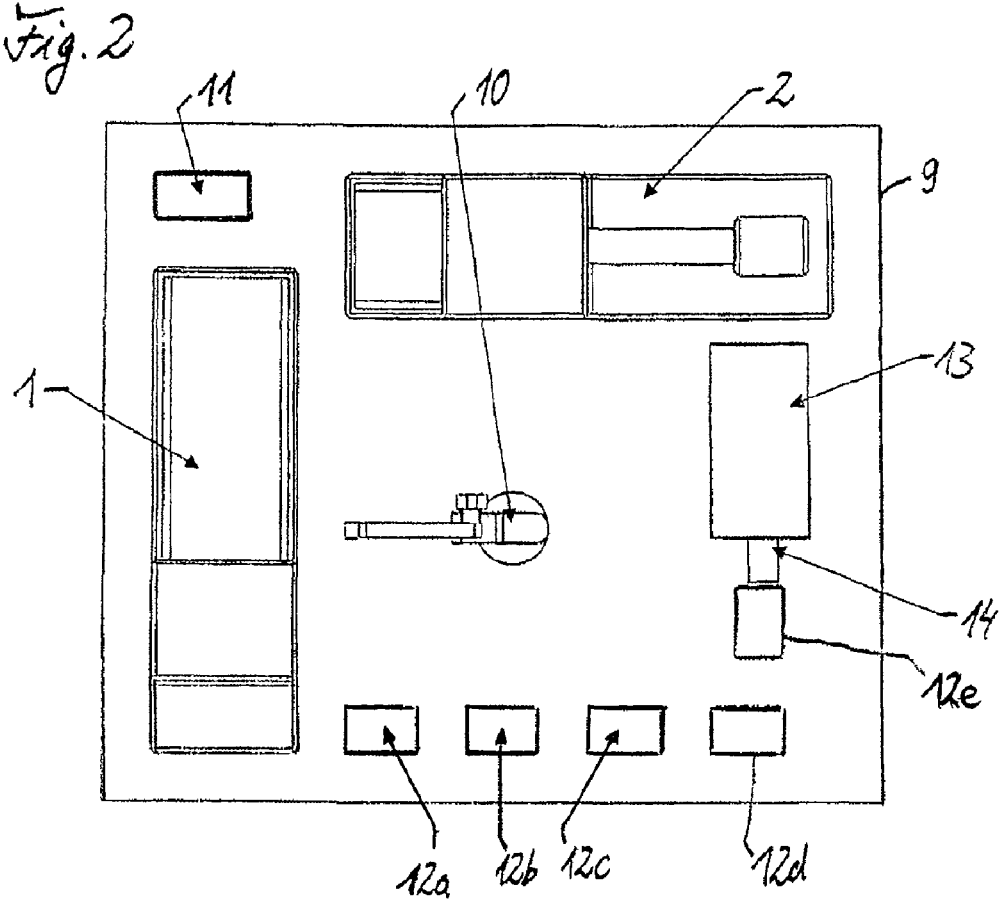
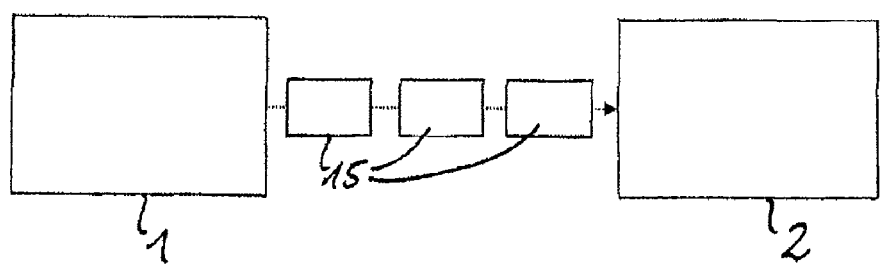

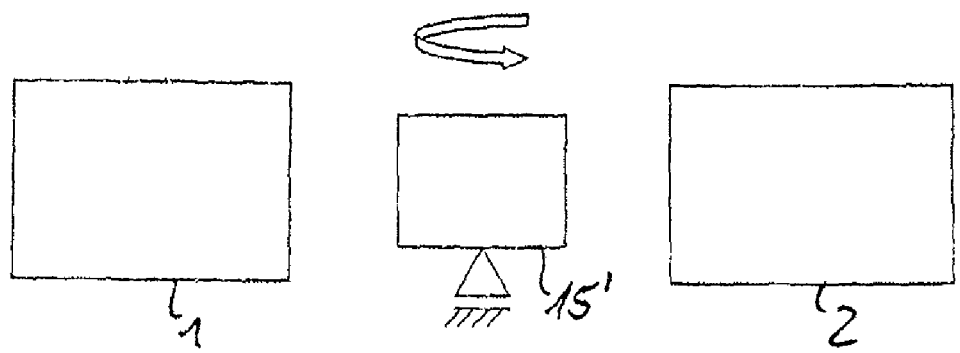
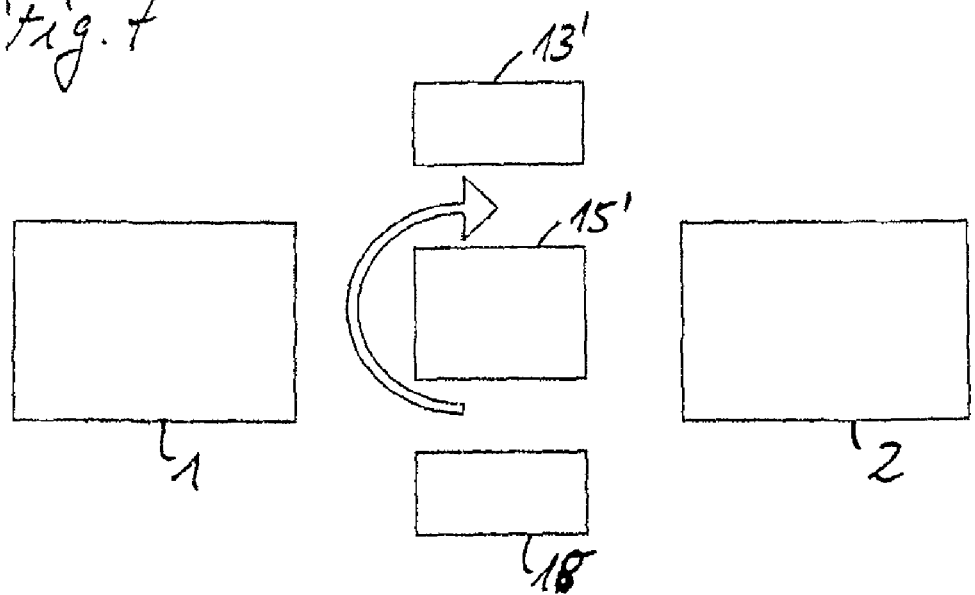

CASTING MACHINE SYSTEM AND PROCESS FOR PRODUCING HYBRID METAL/PLASTIC ARTICLES

BACKGROUND AND SUMMARY OF THE INVENTION

The invention relates to a casting machine system and to a process for producing hybrid metal/plastic articles. In the present context, hybrid metal/plastic articles are understood to mean articles which consist of metal and plastic and are produced by firstly casting a precursor product from one of the two materials and then subjecting the precursor product to a second casting process, in which it is provided with the other material. By way of example, a metal piece can firstly be produced as a precursor product in a metal-casting process, e.g. by means of die-casting, and this can then be encapsulated with plastic, partially coated with plastic or have plastic molded onto it in a corresponding plastic-casting operation, e.g. a plastic injection-molding operation. Alternatively, a plastic part may firstly be produced as a precursor product in a plastic-casting process, and the metal can then be molded onto it in a metal-casting process.

It is prior art, for example, to produce metallic precursor products at a first site and to transfer these by freight to a second site, where the hybrid article is produced from the precursor product by use of the second casting process. In this case, the second casting process does not take place in any time correlation with the first casting process, but instead takes place, for example, days or weeks later, possibly with intermediate storage of the precursor product.

Alternatively, it is prior art to produce hybrid articles of this type within a single machine having relatively complicated molds in order to provide both at least one metal-casting cavity and at least one plastic-casting cavity. In relation to this, mention should be made, for example, of laid-open publications EP 1 718 451 A1, JP 06-246783 A and JP 2000-280277 A. In a further hybrid casting machine of this type, as is disclosed in laid-open publication WO 2005/053930 A1, a temperature monitoring system is additionally implemented, and this includes the measure of measuring the temperature of the precursor product obtained in the first casting process and transmitting it to a control system, which controls the second casting process depending on this temperature information. In this case, the first casting process can be a metal-casting process, but alternatively also a plastic injection-molding process, and this is followed by the second casting process as a plastic injection-molding process or metal-casting process.

The technical problem underlying the invention consists in providing a casting machine system and an associated process for producing hybrid metal/plastic articles, which make it possible to produce hybrid articles of this type with a comparatively flexible casting machine utilization and relatively low costs and/or in a relatively short time.

The invention solves this problem by providing of a casting machine system for producing hybrid metal/plastic articles, including (a) a first casting machine and a separate second casting machine, wherein the first casting machine is a metal-casting machine and the second casting machine is a plastic-casting machine, or the first casting machine is a plastic-casting machine and the second casting machine is a metal-casting machine; (b) a transfer device for transferring a precursor product, produced by a first casting process in the first casting machine, to the second casting machine, in which a hybrid metal/plastic article is formed from the precursor product by a second casting process; and (c) a temperature-regulating device for regulating the temperature of the precursor product in a controllable manner after its removal from the first casting machine, and before starting the second casting process. The invention also includes a manufacturing process for producing hybrid metal/plastic articles, including the following acts: (a) casting a precursor product by a first casting process in a first casting machine; (b) removing the precursor product from the first casting machine; (c) controllably adjusting the temperature of the precursor product removed and transferring said precursor product to a second casting machine; and (d) carrying out a second casting process using the precursor product, introduced into the second casting machine, in order to form a hybrid metal/plastic article, wherein the first casting machine is a metal-casting machine and the second casting machine is a plastic-casting machine, or the first casting machine is a plastic-casting machine and the second casting machine is a metal-casting machine.

The casting machine system according to the invention includes a metal-casting machine and a plastic-casting machine as two separate, i.e. independent, casting machines. This makes it possible to use the two machines flexibly also when required for a different purpose, i.e. in order to produce pure metallic cast pieces or pure plastic injection-molding products. On the other hand, it is possible to avoid a greater outlay on transport/freight by erecting the two casting machines at the same production site. A transfer device ensures the transfer of the precursor product, obtained in the first casting process, to the second casting machine, in which the desired hybrid metal/plastic article is then formed from the precursor product by way of a second casting process.

The casting machine system includes a temperature-regulating device designed so as to be able to regulate the temperature of the precursor product in a controllable manner after it has been removed from the first casting machine, before it is subjected to the second casting process. In the present context, the term "temperature regulation" is to be understood as meaning active heating and/or cooling, which can be suitably selected in each case, of the precursor product by an appropriately provided heating or cooling apparatus. Depending on the requirement and application, the ability to control this temperature regulation may relate to an open-loop control or, alternatively, to a closed-loop control of the relevant temperature-regulating process or of the temperature of the precursor product. This makes it possible to produce corresponding hybrid metal/plastic articles, e.g. by means of the inventive manufacturing process.

In one structurally and functionally advantageous refinement of the invention, the temperature-regulating device is a fully or partially integrated constituent part of the transfer device. In a further refinement of this measure, the transfer device includes at least one workpiece carrier on which the precursor product can be placed, and the temperature-regulating device includes, as an integral part of the workpiece carrier, a temperature sensor unit and/or a temperature-regulator for actively heating or cooling the precursor product. This makes it possible for the precursor product to be held at a desired temperature in a controlled manner as it is transferred from the first casting process to the second casting process.

One refinement of the invention utilizes residual heat. For this purpose, the temperature-regulating device can include a residual heat utilization device which can utilize residual heat of the hybrid article, after it has been produced in the second casting process, to heat a precursor product obtained in each case in the first casting process.

In one refinement of the invention, the temperature-regulating device includes a detector and/or monitoring for a temperature of the precursor product after it has been removed from the first casting machine. This can contribute to an advantageous, controlled temperature regulation of the precursor product after it has been removed from the first casting machine.

In one development of the invention, the precursor product can be subjected to a corresponding processing process in a processing station, before it is moved into the second casting machine. The temperature-regulating device is used to hold the precursor product at a desired temperature higher than room temperature before, during and/or after this processing process. In this case, the processing process can also be an assembly process or include such a process.

The casting machine system includes a processing station for receiving the precursor product removed from the first casting machine and for carrying out a predefinable processing process during a cooling phase, during which the precursor product is cooled from a temperature at the end of the first casting process to a lower, predefinable desired temperature before the start of the second casting process. This desired temperature has a temperature value which is predefined higher than room temperature. This measure makes it possible to subject the precursor product to the relevant processing process during a time period required for cooling before the second casting process is carried out, as provided in the inventive manufacturing process, as a result of which the overall duration of the production of the hybrid component can, in turn, be optimized. For this purpose, it can be ensured that the processing process is stopped as soon as the precursor product has reached the predefined desired temperature. Temperature regulation within the context of active heating and/or cooling is not absolutely necessary in this case, but can optionally be provided, for example in order to hold the precursor product at the desired temperature for a certain time longer.

In one refinement of the invention, the desired cooling temperature is between 60° C. and 190° C., as a result of which it is possible to ensure optimum linking or adaptation to the subsequent second casting process.

In one development of the invention, the transfer device includes a handling robot. This robot can be used to transport the precursor product in a very convenient and automated manner, including removal from the first casting machine and/or movement into the transfer device and/or movement into an optional processing station and/or into the second casting machine.

In one refinement of the invention, a metallic precursor product is produced in a metal-casting machine in the first casting process, a sprue of this metallic precursor product being left at least until it has been completely transferred into the second casting machine. The sprue can thereby be utilized for handling purposes during the transfer, for example. In a further refinement, the metallic sprue can be encapsulated by injection molding with plastic material by the second casting process, in order to thereby form a hybrid metal/plastic article having a corresponding form.

Advantageous embodiments of the invention are shown in the drawings and are described in the text which follows.

BRIEF DESCRIPTION OF THE DRAWINGS

FIG. 1 is a schematic block diagram of a process for producing hybrid metal/plastic articles and of a casting machine system suitable therefore;

FIG. 2 is a plan view of a physical structure of a casting machine system for producing hybrid metal/plastic articles;

FIG. 3 is a schematic block diagram of a casting machine system with a linear transfer device;

FIG. 6 is a front-view block diagram of a casting machine system with a cube transfer device; and FIG. 7 is a plan-view block diagram of the casting machine system shown in FIG. 6.

DETAILED DESCRIPTION OF THE DRAWINGS

Figure 4:
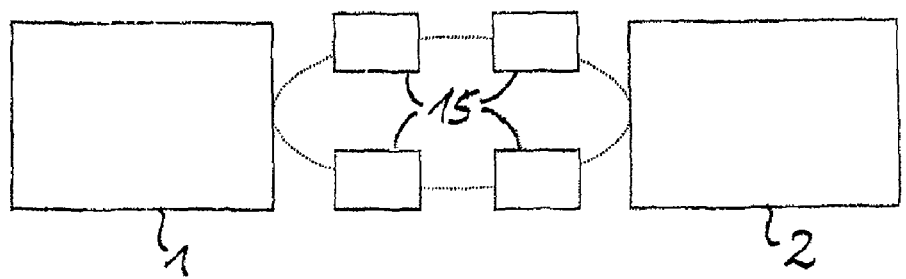
FIG. 4 is a block diagram of a casting machine system with a circulating transfer device.

The casting machine system shown in FIG. 1 includes a first casting machine in the form of a die-casting machine 1 for metallic the casting, and a second casting machine in the form of a plastic injection-molding machine 2, which is provided separately from the first casting machine 1 but associated therewith in a defined spatial manner. The die-casting machine 1 has a conventional design with one or more metal-casting cavities, in order to cast a corresponding metallic precursor product 4 from a prepared molten metal 3, e.g. a melt of zinc, aluminum, magnesium or another nonferrous (NF) metal. A sprue on the metallic precursor product 4 can be removed via a conventional sprue/gate system 5 after the precursor product has been removed from a casting mold, which provides the associated metal-casting cavity, of the die-casting machine 1, and can be fed back to the molten metal preparation 3.

When it is removed from the die-casting machine 1, the metallic precursor product 4 thus obtained in the metallic die-casting operation as a first casting process is at a temperature level T1, which is dependent on the casting process and the metal used, and is moved by a transfer and temperature-regulating device 6 to the site of the second casting machine 2, and set at a predefinable temperature level T2, which is suitable for the performance of a second casting process, in this case a plastic injection-molding process, by way of the second casting machine 2. The metal precursor product 4' which is held at this target temperature T2 by temperature regulation is then placed in a corresponding casting cavity of the plastic injection-molding machine 2 and is encapsulated with plastic material 7 fed in, partially coated therewith and/or has the latter molded onto it. This provides a desired hybrid metal/plastic article 8 which can then be removed from the plastic injection-molding machine 2.

The transfer and temperature-regulation device includes suitable transfer and temperature-regulating devices in order to transfer the precursor product 4 from the site of the die-casting machine 1 to the site of the plastic injection-molding machine 2 and, in the process, to bring the precursor product from the temperature T1 at the end of the metallic die-casting process to the temperature T2, which is suitable for the performance of the plastic injection-molding process. The two casting machines 1, 2 are typically arranged so as to be spatially adjacent, e.g. in the same production hall, and therefore the transfer path for the precursor product is kept relatively short, e.g. typically several meters to several tens of meters. Depending on the requirement and application, the temperature-regulator is suitably designed to regulate the temperature of the precursor product before, during and/or after the transfer thereof from the site of the first casting machine 1 to the site of the second casting machine 2 as desired, i.e. to bring the precursor product from temperature level T1 to temperature level T2. Depending on the situation, this temperature regulation includes active heating of the precursor product by a corresponding heating unit or active cooling thereof by a corresponding cooling device. In this case, the temperature-regulator, and thus its temperature-regulation devices can be fully or partially integrated in the transfer device. In addition, it is possible for one or more processing stations to be fully or partially integrated in the transfer and temperature-regulation device 6, in order to process the precursor product in a desired manner before it is placed in the plastics injection-molding machine 2.

As can be gathered from FIG. 1 and the above explanations, FIG. 1 shows both essential components of the casting machine system considered and, at the same time, the depicted process sequence for producing corresponding hybrid metal/plastic components. In a further substantiation, FIG. 2 shows a plan view of a possible, advantageous layout design of a casting machine system of the type shown in FIG. 1. As can be seen from FIG. 2, the entire casting machine system is located within a production area 9, e.g. an associated production hall. A conventional handling robot 10 is located in a central area as an essential constituent part of the transfer device, and the remaining system components including the first casting machine or metal die-casting machine 1 and the second casting machine or plastic injection-molding machine 2 are arranged around the robot. In addition to the two casting machines 1, 2, a plurality of processing stations 12a to 12e and a temperature-regulation station 13 with an associated conveyor belt unit 14 are arranged in the access region of the handling robot 10. A control unit 11, which controls the entire casting machine system, is arranged at a suitable location outside the access region of the handling robot 10.

After the precursor product has been produced in the first casting machine 1, it is removed from the associated casting mold by the handling robot 10 and, depending on the requirement, transferred directly to the second casting machine 2 or initially moved into the temperature-controlling station 13 or into at least one of the processing stations 12a to 12e. Each processing station 12a to 12e is set up to carry out a specific conventional processing process on the precursor product placed there. By way of example, this process may also involve a pure assembly process or the processing process can include such a process. Depending on the application, the precursor product may be processed only in one of the processing stations 12a to 12e or successively in a plurality of the processing stations 12a to 12e. The conveyor belt unit 14 can be used to convey the precursor product into the temperature-regulating station 13 where it can be actively heated or cooled, in order to reach and maintain the temperature level desired for placing in the second casting machine 2. In the example shown, the conveyor belt unit 14 is connected directly to a last processing station 12e. Whereas, in the example shown, the precursor product is also transported between the processing stations by the handling robot 10, in alternative embodiments a conveyor belt unit which serves this purpose and connects the processing stations 12a to 12e to one another may be provided.

The temperature-regulating station 13 is suitably designed to fulfill its temperature-regulating function and for this purpose has, in particular, a heating device and/or a cooling device and also a temperature sensor unit, in order to detect the temperature of the precursor product introduced into the temperature-regulating station 13. An associated temperature control unit assesses the information gathered by the temperature sensor unit relating to the temperature of the precursor product and controls the heating or cooling device depending on this information. The precursor product thereby held at the desired temperature level T2 is then removed from the temperature-regulating station 13 by the handling robot 10 and placed in the second casting machine 2 for the performance of the second casting process. Then, the handling robot 10 removes the finished hybrid metal/plastic article from the second casting machine 2.

In the example above shown in FIGS. 1 and 2, the first casting machine 1 is a metal-casting machine and the second casting machine 2 is a plastic injection-molding machine. The temperature level T2, suitable for carrying out the plastic injection-molding process in the second casting machine 2, for the metallic precursor product 4' produced in the first casting process, as it is introduced into the second casting machine 2, is typically higher than room temperature, for example at a temperature value of between 60° C. and 190° C. Depending on the temperature T1 of the precursor product 4 after it has been removed from the first casting machine 1, the cooling rate of the precursor product 4 and the time taken until it is placed in the second casting machine 2, the temperature-regulating device or the temperature-regulating station 13 takes the suitable temperature-regulating measures. If, for example, the precursor product is still too hot, i.e. the temperature of the precursor product is above the desired temperature value for introduction into the second casting machine 2, the temperature-regulating device can actively cool the precursor product 4. This shortens the amount of time taken until the precursor product is introduced into the second casting machine 2 and thus the entire production duration of the hybrid metal/plastic component. If, by contrast, the precursor product just reaches or has undershot the desired temperature value T2 for introduction into the second casting machine 2 before it is ready to be placed in the second casting machine 2, the temperature-regulating device carries out active heating to ensure that the precursor product has reached the desired temperature value T2 when it is placed in the second casting machine 2.

The temperature level T1 at the end of the metallic die-casting process is typically considerably higher than the temperature level T2 desired for introducing the precursor product 4 into the plastic injection-molding machine 2 or for carrying out the plastic injection-molding operation therein. In turn, this temperature level T2 is typically considerably higher than room temperature, i.e. higher than about 20° C. Before, during and/or after the transfer of the precursor product 4 and, if appropriate, during a respective processing process in one of the processing stations 12a to 12e, the precursor product 4 can cool down until it has reached the desired temperature level T2 for introduction into the plastic injection-molding machine 2. In this case, the temperature sensor unit can be designed in such a way that it detects the temperature of the precursor product even before it is introduced into the temperature-regulating station 13, e.g. by way of corresponding temperature sensors which are arranged on the handling robot 10, in particular a gripper part thereof, and/or at the respective processing station 12a to 12e.

If it has been established by this temperature monitoring that the precursor product has reached the desired temperature value T2 for introduction into the plastic injection-molding machine 2, a corresponding embodiment of the invention can provide for the precursor product 4 to be placed at this point in time in the second casting machine 2, if it is still in one of the processing stations 12a to 12e or on the handling robot 10 beforehand. In this case, active heating or cooling measures, as are otherwise carried out in the temperature-regulating station 13, may be dispensed with.

As is clear from the above explanations, the invention makes it possible to optimize/reduce the cycle times for producing hybrid metal/plastic components, in that the temperature of the precursor product produced in the first casting process is monitored and, depending on this temperature, the precursor product is placed at a suitable point-in-time in the second casting machine, or the second casting process is carried out as soon as the precursor product has reached a desired temperature level, or in that the precursor product is held at the desired temperature level or reaches it more quickly as a result of active heating or cooling. Cooling phases or general temperature-regulating phases can simultaneously be utilized to process the precursor product. Even though the temperature-regulating station 13 is arranged separately from the processing stations 12a to 12e in FIG. 2, in alternative embodiments the temperature-regulating device can also be fully or partially integrated in one or more of the processing stations 12a to 12e and/or in the transfer device, such as the handling robot 10.

A further advantage of the casting machine system according to the invention is that it is possible to use, for the two casting machines 1, 2, a metal die-casting machine and a plastic injection-molding machine which are each designed conventionally and can also be utilized intermittently for producing pure metallic workpieces or pure plastic parts. The production according to the invention of hybrid metal/plastic articles does not require any complex molds which together include one or more metal-casting cavities and one or more plastics-casting cavities. Instead, the provision of one or more metal-casting cavities by the metal die-casting machine 1 and one or more plastics-casting cavities by the plastic injection-molding machine 2 suffices.

The text above has primarily dealt with the case where a metallic precursor product is produced in the first casting process by a metal-casting machine and then subjected to a plastic injection-molding operation. However, the invention alternatively similarly encompasses applications in which the first casting machine is a plastic-casting machine and the second casting machine is a metal-casting machine. In the first casting process, a plastic part is then produced as the precursor product, and this is surrounded with metal or has metal molded onto it in the second, metallic casting process in order to form a corresponding hybrid metal/plastic article.

In a further advantageous embodiment (not shown in more detail), provision is made for residual heat utilization, and for this purpose the temperature-regulating device, e.g. such as the one shown in FIGS. 1 and 2, includes a corresponding residual heat utilization device. The residual heat utilization includes the measure of utilizing residual heat of a hybrid metal/plastic article obtained in each case in the second casting process to heat a precursor product obtained in each case in the first casting process. The heat transfer required for this can take place, for example, via a conventional liquid or gaseous heat transfer medium. By way of example, this may be a temperature-regulating medium to which a corresponding temperature-regulating circuit is assigned, and this is used to actively cool the hybrid article produced and to actively heat the precursor product.

A further utilization of residual heat can consist in feeding the still hot sprue, separated from the precursor product by the gate system 5 shown in FIG. 1, into the molten metal preparation 3 and thereby feeding back not only material, but also heat. In an alternative variant of the invention, the sprue is left on the precursor product and can be utilized, for example, as a handling aid during transfer to the second casting machine. It can then be removed once the precursor product has reached the second casting machine, or it is alternatively left for longer and encapsulated by injection molding with plastic or has plastic injection molded onto it in the second casting process, in order to produce a correspondingly formed hybrid metal/plastic article. In general, it is possible within the context of the invention to separate the sprue, as required, before the precursor product is removed from the first casting machine, directly after the precursor product has been removed from the first casting machine, before the precursor product is introduced into the second casting machine and after one or more handling and/or processing operations after the precursor product has been removed from the first casting machine, or after the precursor product has been placed in the second casting machine, or the sprue is not separated at all.

FIGS. 3 to 7 illustrate some special embodiments of possible transfer devices, if appropriate with integrated temperature-regulating and/or processing measures, alternatively or in addition to a handling robot and/or the processing stations 12a to 12e with a coupled-on temperature-regulating station 13 as shown in FIG. 2.

Specifically, FIG. 3 shows a single-track linear transfer device between the first casting machine 1 and the second casting machine 2. This transfer device includes a plurality of successive workpiece carriers 15, the number of which is stipulated, for example, on the basis of the casting cycle times in the two casting machines 1, 2, possible processing operations and temperature-regulating measures.

The individual workpiece carriers 15 can be coupled to one another by way of a conveyor belt unit, for example, or in some other way and/or be conveyed by a handling robot. Each workpiece carrier 15 has a receptacle for the placement of a precursor product removed from the first casting machine 1. Depending on the application, a respective workpiece carrier may be designed as a processing station, or include such a station, in order to subject the precursor product on the workpiece carrier to an appropriate processing operation as it is transferred on the workpiece carrier 15 from the first casting machine 1 to the second casting machine 2. When it reaches the second casting machine 2, the precursor product is removed from the workpiece carrier 15 and inserted into the corresponding casting cavity of the second casting machine 2.

By way of example, the workpiece carriers 15 laden with a respective precursor product move horizontally from the first casting machine 1 to the second casting machine 2, and are returned to the first casting machine 1 by way of a vertical movement. The precursor product can be transferred from the first casting machine 1 to the workpiece carrier 15 and from the latter to the second casting machine 2 in a conventional manner, e.g. by means of grippers, the handling robot, etc. The movement of the workpiece carriers 15, and particularly the speed at which they are transported, are suitably controlled or regulated by a corresponding transfer/temperature-regulating control loop of the associated transfer device, which has an optionally integrated temperature-regulating device, and this includes any possible processing of the precursor products on the workpiece carriers 15, as described above in relation to FIGS. 1 and 2. In other words, the workpiece carriers 15 are a constituent part of the transfer device 6 shown in FIG. 1, and processing stations and/or the temperature-regulating device can be fully or partially integrated in the workpiece carriers 15.

As an alternative to FIG. 3, and likewise in a purely schematic plan view, FIG. 4 shows a circulating transfer device. In the case of this transfer device, the individual workpiece carriers 15 move in a circulatory manner, for example in a horizontal plane by way of a suitable transport unit, e.g. a conveyor belt or the like. Apart from that, all the properties and advantages mentioned above in relation to the transfer device shown in FIG. 3 similarly apply to the transfer device shown in FIG. 4, to which reference can be made. At this point, it should be mentioned that the workpiece carriers 15 may be, for example, parts of injection-molding tools of the plastics injection-molding machine utilized.

Figure 5:
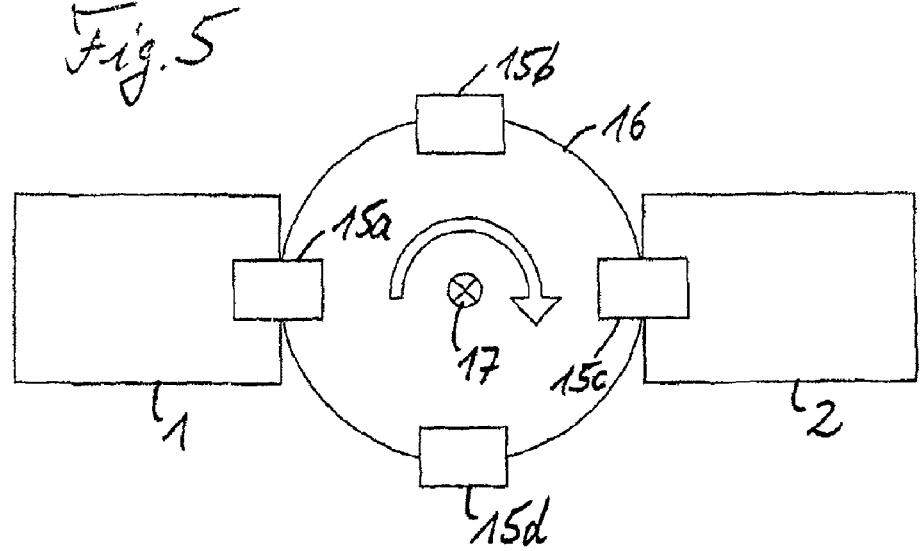
FIG. 5 is a block diagram of a casting machine system with a carousel transfer device.

As a further transport variant, FIG. 5 shows a carousel transfer device, in which the individual workpiece carriers 15 move on a carousel unit 16 around a carousel axis 17 which may be positioned vertically or horizontally, for example. FIG. 5 shows a situation where a first workpiece carrier 15a is coupled directly onto the first casting machine 1. In this case, a metal insert can be molded from the precursor product by correspondingly integrated processing means. A temperature-regulating measure in the form of active heating or cooling of the precursor product and/or further processing of the precursor product can take place, for example, on a second workpiece carrier 15b. A third workpiece carrier 15c is coupled directly onto the second casting machine 2, where the plastics injection-molding operation is carried out using the precursor product transferred at this point. On a fourth workpiece carrier 15d, as seen in the direction of the carousel, further processing of the hybrid metal/plastic component removed from the second casting machine 2 can be carried out or the finished hybrid article can be removed, as required. It is self-evident that analogous operational sequences can be implemented for the transfer devices shown in FIGS. 3 and 4.

FIGS. 6 and 7 show, in a schematic side view and plan view respectively, a cube transfer device having a cuboidal workpiece carrier 15' which, on each of its four lateral side faces, provides an individual workpiece carrier for receiving a precursor product and, on its underside, is mounted such that it can rotate about a vertical axis. Alternatively, the workpiece carrier 15' may be prismatic with a corresponding number of prism side faces or individual workpiece carriers. The workpiece carrier 15' faces the first casting machine 1 or the second casting machine 2 with two opposite lateral side faces or individual workpiece carriers. In the example shown, a temperature-regulating station 13' or a removal station 18 is associated with the two other lateral side faces. At the temperature-regulating station 13', the temperature of the precursor product can be regulated in a desired manner after it has been removed from the first casting machine 1. A processing unit can optionally be integrated in the temperature-regulating station 13' in order to additionally subject the precursor product to a desired processing operation. The finished hybrid metal/plastic component is removed at the removal station 18. A processing station may also optionally be provided there in order to subject the hybrid metal/plastic component to a further processing operation after it has been removed from the second casting machine 2.

As is clear from the above-described embodiments, the invention allows for flexible utilization of a conventional metal-casting machine and of a separate, conventional plastic-casting machine in order to produce hybrid metal/plastic articles, it being possible to stipulate the number of metal-casting cavities or plastic-casting cavities in a variable manner and on the basis, for example, of the respective casting cycle time and the component size. By way of example, the production of metallic precursor products in a first casting process, such as a metal die-casting process, can include the simultaneous production of a predefinable first number of precursor products, for example, in each case two precursor products, during the same period of time in which a predefinable second number of precursor products, for example in each case four precursor products, are subjected to the second casting process in the second casting process, such as a plastic injection-molding process. Here, the first number and the second number can be matched to possibly different cycle times of the two casting processes, and optionally also to the duration of possible processing processes between the first casting process and the second casting process. The number of metal-casting cavities and plastic-casting cavities is suitably geared to the determined, optimum first number of precursor products produced in parallel and the second number of end products produced at the same time, i.e. hybrid metal/plastic articles.

It goes without saying that, apart from the types mentioned explicitly above, any conventional type of machine can be used for the metal-casting machine, on the one hand, and the plastic-casting machine, on the other, in the casting machine system of the invention.

It also goes without saying that, in corresponding embodiments of the invention, one or more further parts can be added to the precursor product produced in the first casting machine, e.g. in the transfer device or a processing station, before the precursor product complemented or modified in this way is subjected to the second casting process in the second casting machine. In this respect, it can be provided, in particular, for a plurality of first casting machines to be associated with a second casting machine and to cooperate therewith, for example, via a corresponding transfer device. In the transfer device or at another location, the precursor product from a first of the plurality of first casting machines can have the precursor product(s) from the further first casting machine(s) added to it, e.g. by means of an assembly or joining operation, before the precursor product finished in this way is then subjected to the second casting process in the second casting machine.

The invention claimed is:

1. A casting machine system for producing hybrid metal/plastic articles, comprising:
    a first casting machine and a second casting machine arranged physically separate from the first casting machine, wherein one of the first and second casting machines is a metal-casting machine and the other is a plastic-casting machine;
    a transfer device for transferring a precursor product, produced by a first casting process in one of the first and second casting machines, to the other casting machine, in which a hybrid metal/plastic article is formed from the precursor product by a second casting process; and
    a temperature-regulating device for regulating a temperature of the precursor product in a controllable manner after removing the precursor product from the first casting machine, and before starting the second casting process, wherein the temperature-regulating device includes at least one of a heating device and a cooling device to regulate the temperature of the precursor product.

2. The casting machine system as claimed in claim 1, wherein the temperature-regulating device is at least partially integrated in the transfer device.

3. The casting machine system as claimed in claim 2, wherein the transfer device comprises at least one workpiece carrier on which the precursor product is placeable, and the temperature-regulating device comprises, as an integral part of the workpiece carrier, at least one of a temperature sensor unit and a temperature-regulator for actively heating or cooling the precursor product.

4. The casting machine system as claimed in claim 1, wherein the temperature-regulating device comprises a residual heat utilization device which utilizes residual heat of a hybrid metal/plastic article obtained in each case in the second casting process to heat a precursor product obtained in each case in the first casting process.

5. The casting machine system as claimed in claim 1, wherein the temperature-regulating device comprises means for detecting and monitoring a temperature of the precursor product after removal from the first casting machine.

6. The casting machine system as claimed in claim 1, further comprising:
a processing station for receiving the precursor product removed from the first casting machine and for carrying out a predefinable processing process before placing the precursor product in the second casting machine;
wherein the temperature-regulating device regulates the temperature of the precursor product before, during and/or after the processing process such that said precursor product is held at a temperature higher than room temperature before being placed in the second casting machine.

7. The casting machine system as claimed in claim 1, wherein the transfer device comprises a handling robot.

8. A casting machine system for producing hybrid metal/plastic articles, comprising:
a first casting machine and a second casting machine arranged physically separate from the first casting machine, wherein one of the first and second casting machines is a metal-casting machine and the other casting machine is a plastic-casting machine;
a transfer device for transferring a precursor product, produced by a first casting process in one of the first and second casting machines, to the other casting machine, in which a hybrid metal/plastic article is formed from the precursor product by a second casting process; and
at least one processing station for receiving the precursor product removed from the first casting machine and for carrying out a predefinable processing process during a cooling phase, during which the precursor product is cooled using a temperature-regulating device for regulating a temperature of the precursor product in a controlled manner from a temperature at the end of the first casting process to a lower, predefinable desired temperature before starting the second casting process, said desired temperature being predefined at a temperature value higher than room temperature.

9. The casting machine system as claimed in claim 8, wherein the desired cooling temperature is predefined at a temperature value of between 60° C. and 190° C.

10. The casting machine system as claimed in claim 8, wherein the transfer device comprises a handling robot.

11. A process for producing hybrid metal/plastic articles, the process comprising the acts of:
casting a precursor product by a first casting process in a first casting machine;
removing the precursor product from the first casting machine;
using a temperature-regulating device for controllably adjusting a temperature of the precursor product removed and transferring said precursor product to a second casting machine; and
carrying out a second casting process using the precursor product, introduced into the second casting machine, in order to form a hybrid metal/plastic article;
wherein one of the first and second casting machines is a metal-casting machine and the other casting machine is a plastic-casting machine, wherein the first casting machine and the second casting machine are arranged physically separate from each other.

12. The process as claimed in claim 11, wherein residual heat of a hybrid metal/plastic article formed in each case in the second casting machine is utilized to regulate the temperature of a precursor product obtained in each case in the first casting process.

13. The process as claimed in claim 11, wherein the precursor product is placed in a processing station after removal from the first casting machine and before being placed in the second casting machine, is processed in said processing station and is held at a predefinable temperature which is higher than room temperature before, during and/or after said processing by controlling the temperature in a controlled manner.

14. The process as claimed in claim 12, wherein the precursor product is placed in a processing station after removal from the first casting machine and before being placed in the second casting machine, is processed in said processing station and is held at a predefinable temperature which is higher than room temperature before, during and/or after said processing by controlling the temperature in a controlled manner.

* * * * *